United States Patent
Rifaat et al.

(10) Patent No.: US 7,333,530 B1
(45) Date of Patent: Feb. 19, 2008

(54) DESPREAD SIGNAL RECOVERY IN DIGITAL SIGNAL PROCESSORS

(75) Inventors: Rasekh Rifaat, Brookline, MA (US); Zvi Greenfield, Ksirsava (IL); Jose Fridman, Brookline, MA (US)

(73) Assignee: Analog Devices, Inc., Norwood, MA (US)

( * ) Notice: Subject to any disclaimer, the term of this patent is extended or adjusted under 35 U.S.C. 154(b) by 0 days.

(21) Appl. No.: 09/925,889

(22) Filed: Aug. 6, 2001

(51) Int. Cl.
   *H04B 1/707* (2006.01)
(52) U.S. Cl. .................................................. 375/147
(58) Field of Classification Search ............... 375/130, 375/147, 316, 150, 343, 346, 340
   See application file for complete search history.

(56) References Cited

U.S. PATENT DOCUMENTS

| | | | |
|---|---|---|---|
| 5,799,010 A * | 8/1998 | Lomp et al. ............... | 370/335 |
| 5,930,230 A | 7/1999 | Odenwalder et al. | |
| 6,035,316 A * | 3/2000 | Peleg et al. ............... | 708/523 |
| 6,092,183 A * | 7/2000 | Takewa et al. ............. | 712/215 |
| 6,366,607 B1 * | 4/2002 | Ozluturk et al. ............ | 375/152 |
| 6,424,619 B2 | 7/2002 | Odenwalder et al. | |
| 6,606,684 B1 * | 8/2003 | Ramagopal et al. ........ | 711/118 |
| 6,680,928 B1 * | 1/2004 | Dent .......................... | 370/342 |
| 6,879,576 B1 * | 4/2005 | Agrawal et al. ............ | 370/342 |
| 6,934,728 B2 * | 8/2005 | Catherwood ................ | 708/200 |
| 7,072,929 B2 * | 7/2006 | Pechanek et al. ........... | 708/622 |
| 2003/0014457 A1* | 1/2003 | Desai et al. ................ | 708/520 |

FOREIGN PATENT DOCUMENTS

EP    1017183 A2 *  7/2000

* cited by examiner

*Primary Examiner*—Kevin Burd
(74) *Attorney, Agent, or Firm*—Wolf, Greenfield & Sacks, P.C.

(57) ABSTRACT

A digital signal processor performs despread decoding in wireless telephone systems. Orthogonal codes are used to combine data signals into one overall coded signal which is transmitted. The orthogonal codes are used to retrieve individual data signals from the transmitted overall coded signal. Despread instructions are included in the digital signal processor functionality.

28 Claims, 10 Drawing Sheets

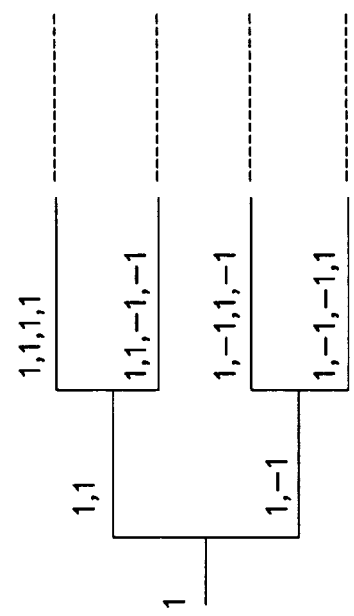

602
TR0 = DESPREAD (R3:0, THR1:0)      ; xR3:0 = SDAB Q[J0+=8];;
604
xTR0 = DESPREAD (R7:4, THR1:0) + TR0; xR7:4 = SDAB Q[J0+=8];;
606
xTR0 = DESPREAD (R3:0, THR1:0) + TR0; xR3:0 = SDAB Q[J0+=8];;
608
xTR0 = DESPREAD (R7:4, THR1:0) + TR0; xR7:4 = SDAB Q[J0+=8];
610
xTHR1:0 = R19:18 (I);;

FIG. 11

DESPREAD SIGNAL RECOVERY IN DIGITAL SIGNAL PROCESSORS

FIELD

This invention relates to digital signal processors for wireless telephone applications and, more particularly, to instructions for isolating signal components using near orthogonal codes.

BACKGROUND

When implementing cellular telephone systems, it is important to maximize the amount of data that can be transmitted at the available frequency. This often involves altering the data signals to permit the transmission of more data. These alterations must be reversible so that the original signal can be sufficiently recovered at the receiving end. One method of altering the data is through code division multiple access (CDMA) and spreading.

Spreading is a method of altering data whereby a normally narrowband signal is translated into a very wide band signal. Spreading a signal over a wide frequency band allows the signal to be transmitted and received using less power. Spreading is achieved by multiplying the original signal by a code which expands and duplicates the signal. The number of times the signal is duplicated over the wide frequency band is known as the spreading factor. For example, a spreading code of (1, 1, 1, 1) has a spreading factor of 4 because each signal portion (known as a "symbol") is repeated four times when the code is multiplied by a signal. The above example of a spreading code, when multiplied by a signal comprised of symbols "abcd", yields a spread signal of "aaaabbbbccccdddd." If the spreading code is (1, −1, 1, −1) issued to spread the same symbols then the spread signal is "aa$\overline{aa}$bbb$\overline{bb}$ccc$\overline{cc}$ddd$\overline{dd}$" where $\overline{x}$ represents the negative of the original symbol x. Once spread, the wide band signal is transmitted to the receiver. The signal is despread at the receiver end to recover the original signal. The code used to spread the signal is also used to despread the signal.

Because of several factors, including the intensive computational requirements of a despread function, receivers have implemented despreaders which have included the use of ASICs and the use of a hardware block having the most basic components in a digital signal processor. These implementations suffer from lack of programmability. Other despreaders have included the use of FPGAs, but these are undesirable because of cost and because they do not offer sufficient flexibility in programming.

A digital signal processor, rather than an ASIC, is a desirable solution because of its software programmability. However, it is difficult for a digital signal processor to handle the high speed complex calculations necessary to implement a satisfactory despreader.

Accordingly, there is a need for improved implementations of despreaders for use in decoding transmitted wireless telephone signals.

SUMMARY

A method is provided for processing a signal value in a digital signal processor, the method comprising the step of, in response to a single instruction that specifies at least a signal value and a despreading code, multiplying the signal value by the despreading code. The method may further comprise the step of adding the result of the multiplying to a result from a previous multiplication. The despreading code may have a spreading factor divisible by 4. The despreading code may be divided into code segments, each code segment comprising a 2 bit complex code including 1 real bit and 1 imaginary bit. For the code bits, a set code bit may represent a value of −1 and a clear code bit may represent a value of +1. The signal value may comprise 16 bits, including 8 real bits and 8 imaginary bits.

A further method is provided for calculating a data set in a digital signal processor, the method comprising the steps of, in response to one or more instructions that specify at least a signal value and a set of codes, for each one of the set of codes multiplying the signal value by one of the set of codes; summing results of the multiplying; and producing a data set resulting from the summing. The summing may comprise summing results of the multiplying with the results of a multiplying by a previous set of codes. The set of codes may have a spreading factor divisible by 4. Each one of the set of codes may be a 2 bit complex code comprising 1 real bit and 1 imaginary bit. A set code bit may represent a value of −1 and a clear code bit may represent a value of +1. The signal value may comprise 16 bits, including 8 real bits and 8 imaginary bits.

In a further embodiment a digital signal processor is provided, the digital signal processor comprising a memory for storing instructions and operands for digital signal computations; a program sequencer for generating instruction addresses for fetching selected ones of said instructions from said memory; and a computation block comprising a register file for temporary storage of operands and results and an execution block for executing a decoding instruction that specifies a data signal and a code, said execution block comprising a complex multiply and accumulate engine for multiplying portions of the data signal by the code and accumulating the results. The digital signal processor may, in response to execution of the decoding instruction by the digital signal processor, perform a set of complex multiplies on portions of the data signal and portions of the code; and sum the results of the complex multiplies. The code may have a spreading factor divisible by 4. In a further embodiment, the code is divided into code segments, each code segment comprising a 2 bit complex code including 1 real bit and 1 imaginary bit. In a still further embodiment, a set code bit represents a value of −1 and a clear code bit represents a value of +1. The data signal may comprise 16 bits, including 8 real bits and 8 imaginary bits.

In another embodiment, a method is provided for calculating output data in a digital signal processor, the method comprising the steps of, in response to one or more instructions that specify at least a set of complex first operands, each one of the first operands comprising 8 real bits and 8 imaginary bits, and a set of complex second operands, each one of the second operands comprising 1 real bit and 1 imaginary bit, for each one of the second operands performing a complex multiplication of one of the first operands by one of the second operands; summing results of the multiplying over the set of second operands; and producing as an output a set of data resulting from the summing. In a further embodiment a set bit in one of the second operands represents a value of −1 and a clear bit in one of the second operands represents a value of +1. In still a further embodiment, the set of complex second operands comprises a despreading code. In yet another embodiment, the set of complex first operands comprises an incoming data signal. In a further embodiment the incoming data signal is a voice transmission signal.

A method is further provided for processing a signal value in a digital signal processor, comprising the step of, in response to a complex signal value and a two bit complex code segment specified by an instruction, performing a complex multiply of the signal value by the code segment to provide a processed data value.

A method is further offered for processing signal values in a digital signal processor comprising the steps of, (a) in response to a set of complex signal values and a corresponding set of complex code segments specified by an instruction, performing a complex multiply of each signal value by a corresponding code segment to provide a set of intermediate values; and (b) performing complex addition of the intermediate values to provide a processed signal value. The method may further comprise the steps of repeating steps (a) and (b) for a plurality of sets of complex signal values to provide a stream of processed signal values. In the method, each of the complex code segments may be a two bit complex code.

BRIEF DESCRIPTION OF THE DRAWINGS

For a better understanding of the present invention, reference is made to the accompanying drawings, which are incorporated herein by reference and in which:

FIG. 5 illustrates the mapping of digital bits to representation points on a complex plane;

FIG. 6 illustrates the mapping of digital bit pairs to representation points on a complex plane;

FIG. 7 illustrates an example of an orthogonal code tree;

FIG. 11 illustrates software code for performing despreading in accordance with an aspect of the invention.

DETAILED DESCRIPTION

For the purposes of illustration, the techniques described below are described in the context of the transmission of cellular telephone signals. However, many of the techniques described, while useful for cell phones, may also be for other high speed data transmission applications.

Figure 1:
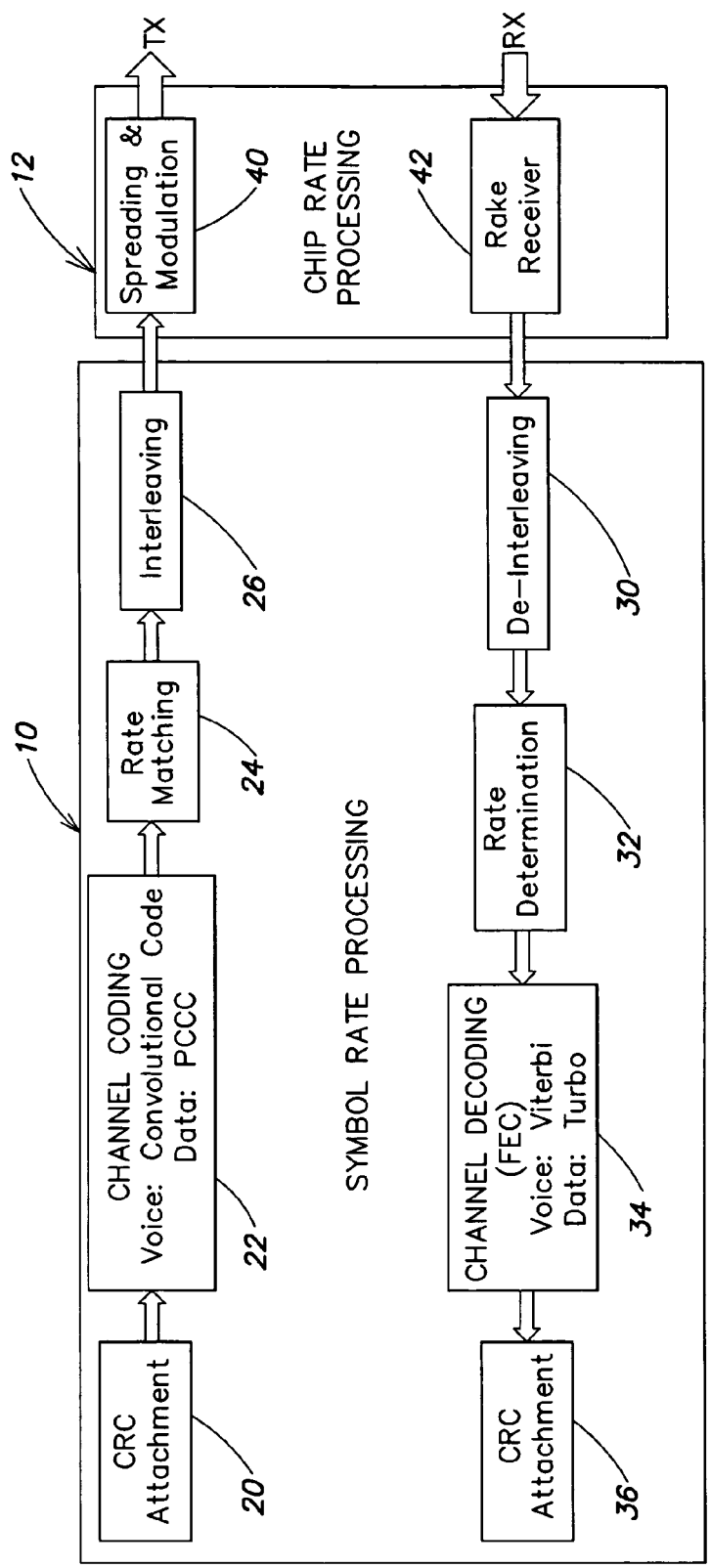
FIG. 1 is a block diagram of a wireless telephone base station signal chain.

A block diagram of an example of a wireless telephone base station signal chain is shown in FIG. 1. The signal chain includes symbol rate processing 10 and chip rate processing 12. It is desirable to incorporate the symbol rate processing 10 into a digital signal processor. On the transmit side, the symbol rate processing 10 includes a CRC attachment block 20, a channel coding block 22, a rate matching block 24 and an interleaving block 26. On the receive side, the symbol rate processing 10 includes a de-interleaving block 30, a rate determination block 32, a channel decoding block 34 and a CRC attachment block 36.

The chip rate processing 12 includes a spreading and modulation block 40 on the transmit side, and a rake receiver 42 on the receive side. A digital signal processor which performs despreading may be utilized on the receive side.

Figure 2:
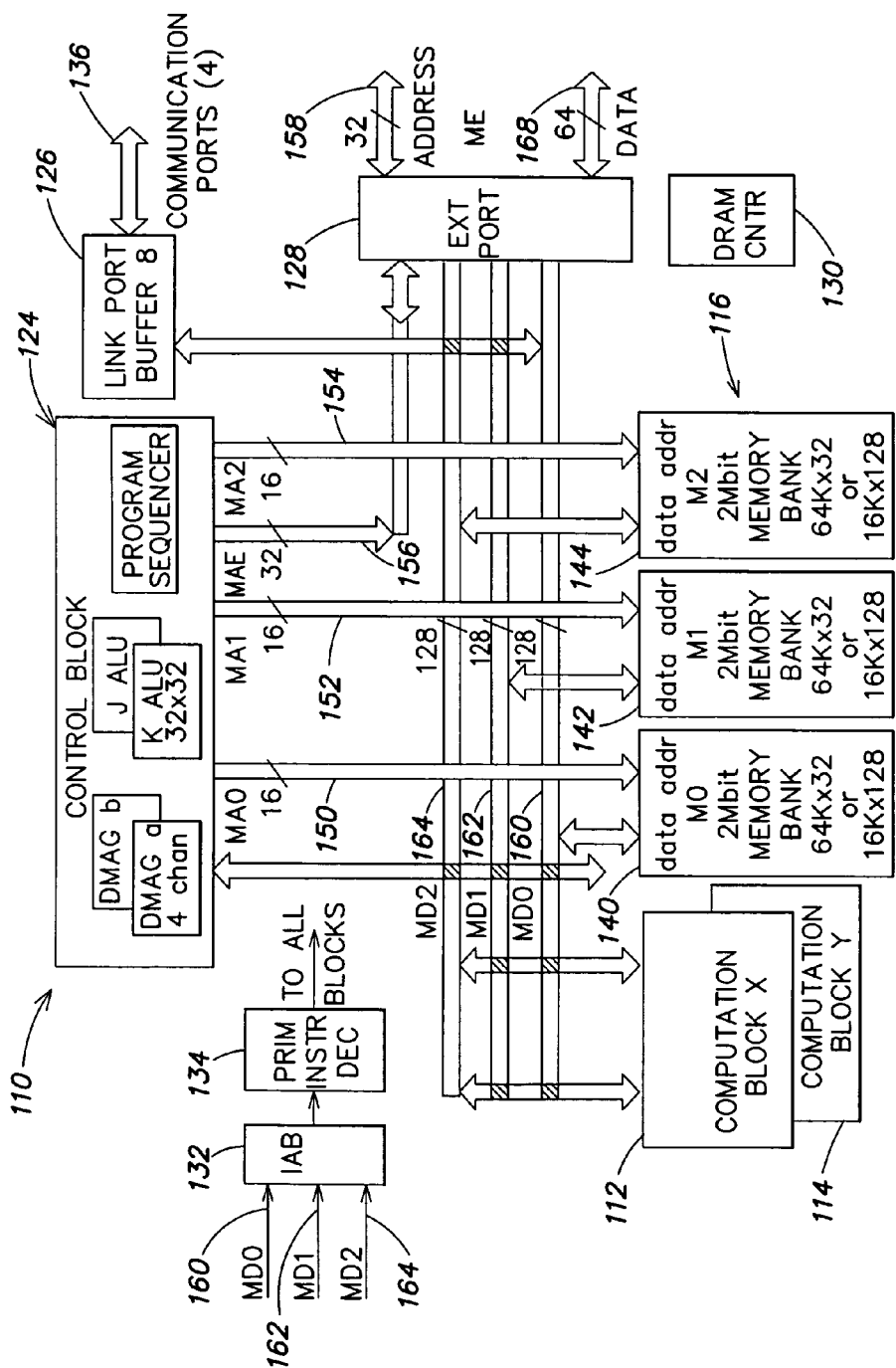
FIG. 2 is a block diagram of a digital signal processor suitable for implementing channel decoders in accordance with an aspect of the invention.

A block diagram of an example of a digital signal processor (DSP) 110 suitable for implementing features of the present invention is shown in FIG. 2. The principal components of the DSP 110 are computation blocks 112 and 114, a memory 116, a control block 124, link port buffers 126, an external port 128, a DRAM controller 130, an instruction alignment buffer (IAB) 132 and a primary instruction decoder 134. The computation blocks 112 and 114, the instruction alignment buffer 132, the primary instruction decoder 134 and the control block 124 constitute a core processor which performs the main computation and data processing functions of the DSP 110. The external port 128 controls external communications via an external address bus 158 and an external data bus 168. The link port buffers 126 control external communication via communication ports 136. The DSP is preferably configured as a single monolithic integrated circuit.

The memory 116 may include three independent, large capacity memory banks 140, 142 and 144. In a preferred embodiment, each of the memory banks 140, 142 and 144 has a capacity of 64 K words of 32 bits each. As discussed below, each of the memory banks 140, 142 and 144 preferably has a 128-bit data bus. Up to four consecutive aligned data words of 32 bits each can be transferred to or from each memory bank in a single clock cycle.

The elements of the DSP 110 are interconnected by buses for efficient, high speed operation. Each of the buses includes multiple lines for parallel transfer of binary information. A first address bus 150 (MA0) interconnects memory bank 140 (M0) and control block 124. A second address bus 152 (MA1) interconnects memory bank 142 (M1) and control block 124. A third address bus 154 (MA2) interconnects memory bank 144 (M2) and control block 124. Each of the address buses 150, 152 and 154 is preferably 16 bits wide. An external address bus 156 (MAE) interconnects external port 128 and control block 124. The external address bus 156 is interconnected through external port 128 to external address bus 158. Each of the external address buses 156 and 158 is preferably 32 bits wide. A first data bus 160 (MD0) interconnects memory bank 140, computation blocks 112 and 114, control block 124, link port buffers 126, IAB 132 and external port 128. A second data bus 162 (MD1) interconnects memory bank 142, computation blocks 112 and 114, control block 124, link port buffers 126, IAB 132 and external port 128. A third data bus 164 (MD2) interconnects memory bank 144, computation blocks 112 and 114, control block 124, link port buffers 126, IAB 132 and external port 128. The data buses 160, 162 and 164 are connected through external port 128 to external data bus 168. Each of the data buses 160, 162 and 164 is preferably 128 bits wide, and external data bus 168 is preferably 64 bits wide.

The first address bus 150 and the first data bus 160 comprise a bus for transfer of data to and from memory bank 140. The second address bus 152 and the second data bus 162 comprise a second bus for transfer of data to and from memory bank 142. The third address bus 154 and the third data bus 164 comprise a third bus for transfer of data to and from memory bank 144. Since each of the memory banks 140, 142 and 144 has a separate bus, the memory banks 140, 142 and 144 may be accessed simultaneously. As used herein, "data" refers to binary words, which may represent either instructions or operands that are associated with the operation of the DSP 110.

In a typical operating mode, program instructions are stored in one of the memory banks, and operands are stored in the other two memory banks. Thus, at least one instruction and two operands can be provided to the computation blocks 112 and 114 in a single clock cycle. Each of the memory banks 140, 142 and 144 may be configured to permit reading and writing of multiple data words in a single clock cycle. The simultaneous transfer of multiple data words from each memory bank in a single clock cycle is accomplished without requiring an instruction cache or a data cache.

As indicated above, each of the memory banks 140, 142 and 144 preferably has a capacity of 64 K words of 32 bits each. Each memory bank may be connected to a data bus that is 128 bits wide. In an alternative embodiment, each data bus may be 64 bits wide, and 64 bits are transferred on each of clock phase 1 and clock phase 2, thus providing an effective bus width of 128 bits. Multiple data words can be accessed in each memory bank in a single clock cycle. Specifically, data can be accessed as single, dual or quad words of 32 bits each.

Using quad word transfers, four instructions and eight operands, each of 32 bits, can be supplied to the computation blocks 112 and 114 in a single clock cycle. The number of data words transferred and the computation block or blocks to which the data words are transferred are selected by control bits in the instruction. The single, dual or quad data words can be transferred to computation block 112, to computation block 114, or to both. Dual and quad data word accesses improve the performance of the DSP 110 in many applications by allowing several operands to be transferred to the computation blocks 112 and 114 in a single clock cycle. The ability to access multiple instructions in each clock cycle allows multiple operations to be executed in each clock cycle, thereby improving performance.

Figure 3:
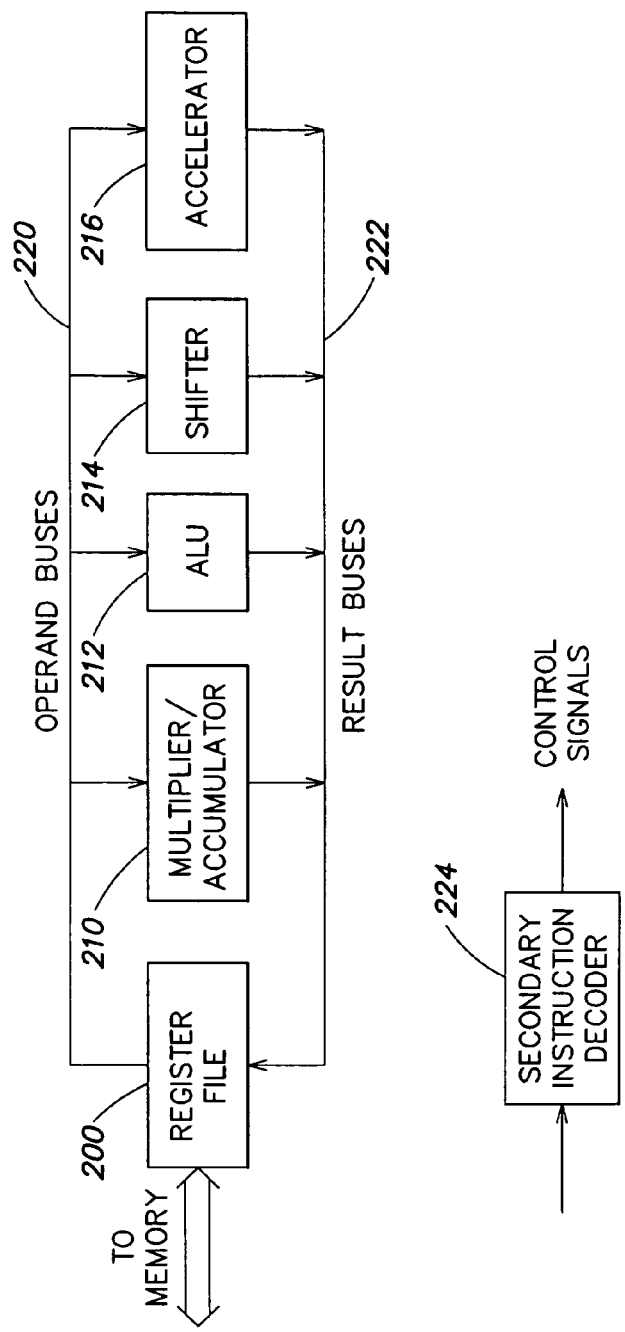
FIG. 3 is a block diagram of an embodiment of each computation block shown in the digital signal processor of FIG. 2.

A block diagram of an embodiment of each of the computation blocks 112 and 114 is shown in FIG. 3. A multiple port register file 200 provides temporary storage for operands and results. In a preferred embodiment, the register file 200 has a capacity of 32 words of 32 bits each, organized as eight rows of 128 bits each. The register file 200 is connected through a multiplexer and latch (not shown) to each of the data buses 160, 162 and 164 (FIG. 2). When operands are fetched from memory 116, two of the three data buses are selected, and the operands on the selected buses are supplied to the register file 200.

The computation block shown in FIG. 3 includes a multiplier/accumulator 210, an arithmetic logic unit (ALU) 212, a shifter 214 and an accelerator 216. The multiplier/accumulator 220, the ALU 212, the shifter 214 and the accelerator 216 are capable of simultaneous execution of instructions to the extent that sufficient instructions and operands can be supplied to the computation blocks. Operands are supplied from the register file 200 to multiplier/accumulator 210, ALU 210, shifter 214 and accelerator 216 on operand buses 220. Results from the multiplier/accumulator 210, the ALU 212, the shifter 214 and the accelerator 216 are returned to register file 200 on result buses 222. The components of the computation block are controlled by signals from a secondary instruction decoder 224, in response to a decoded instruction. The computation block preferably has a pipelined architecture for improved performance.

Each of the computation blocks 112 and 114 in the DSP includes the accelerator 216 for enhanced performance in wireless telephone base stations. The accelerator includes registers for temporary storage of data and control values, and accelerator circuitry for executing specified instructions. The accelerator performs the complex multiplication required in a despread function, as described below.

Figure 4:
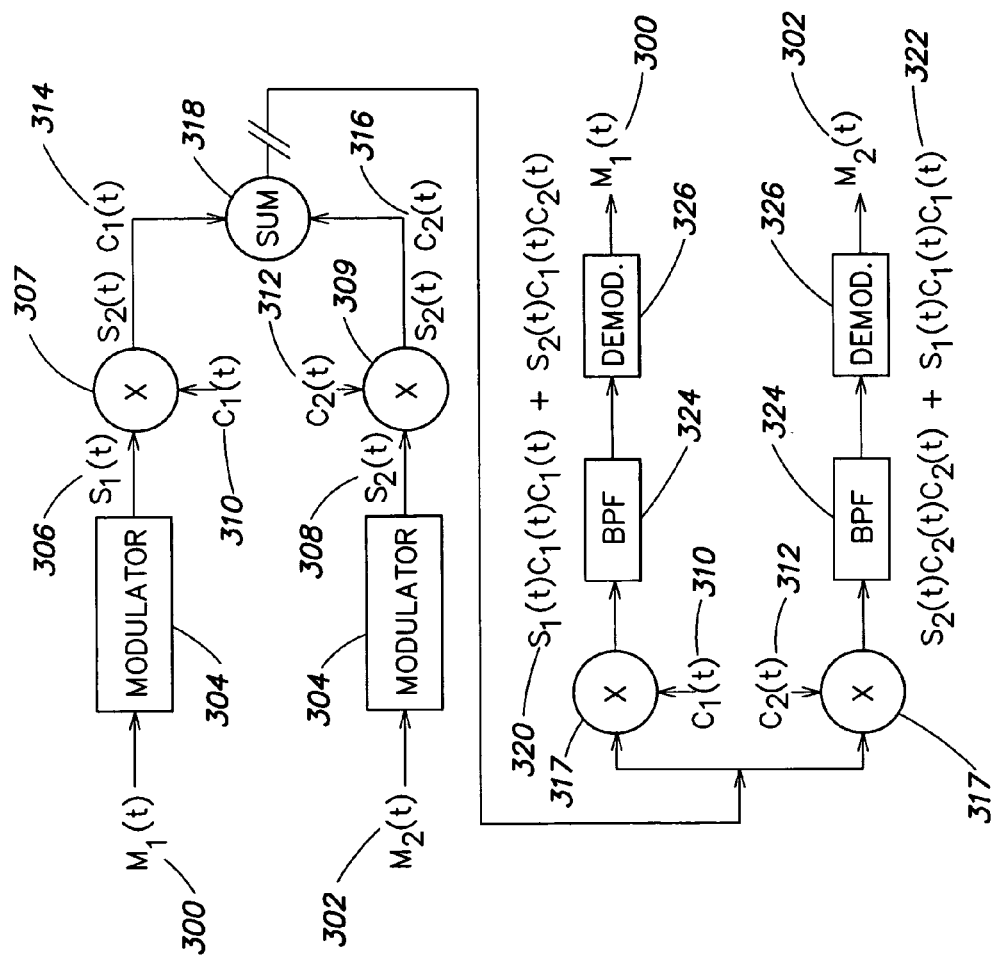
FIG. 4 is a block diagram that illustrates the process of spreading and despreading using orthogonal codes.

A simplified diagram illustrating the processes of spreading and despreading is shown in FIG. 4. Two digitized voice signals 300 and 302 are processed by modulators 304 in preparation for transmission. Modulation is the process by which digital bits are mapped to a complex numbers for radio transmission. As shown in FIG. 5 the digital bit 0 and digital bit 1 are mapped to points on a complex plane. For increased transmission rates, one point on the complex plane may represent multiple bits. For example in FIG. 6 bit pairs are mapped to points on the complex plane. In this manner, a receiver which receives a complex signal with a value of 1+j interprets that signal as the digital bit pair 00. Points may be chosen in this manner to represent digital bit triplets, quadruplets, etc. However, the points must be chosen to be sufficiently far apart in the complex plane so that the receiver may accurately interpret received complex values. The resulting modulated data signal portions are known as symbols.

Symbols 306 and 308 are each multiplied in multipliers 307 and 309 by a respective complex spreading code, 310 or 312. The complex spreading codes 310 and 312 are chosen so they are orthogonal to one another. By making the complex codes orthogonal, the resulting coded signals 314 and 316 may be added by summing unit 318 without interfering with the system's ability to later receive the codes. An example of two codes which are orthogonal to each other is (1, 1) and (1, −1).

It is important to remember that while FIG. 4 depicts spreading and despreading for a transmission containing only two signals, more than two signals may be combined for transmission. If multiple signals are combined, each signal requires a spreading code which is orthogonal to every other code, so that the symbols may be retrieved at the receiving end. There are several methods for determining code sets with sufficient orthogonality; a preferred method is depicted in the tree of FIG. 7. To create codes which are orthogonal to all other codes in the tree, the base code (in the example, (1)) is repeated twice in a top branch and repeated once and negated once in a bottom branch. For example the code (1) repeated twice become (1, 1). The code (1) repeated and negated becomes (1, −1). The resulting codes are then repeated twice in a top branch and repeated and negated in a bottom branch according to the algorithm shown in FIG. 7. All resulting codes derived in this method are orthogonal to each other. Choosing orthogonal codes ensures that the signals are retrievable by the receiver.

After spreading, the coded signals are summed and transmitted to the receiver. The summed and spread signal portions are known as chips. The received signal is despread at despread blocks 317 and 319. A despread function is simplified as a multiply and accumulate function. The received signal is supplied to different branches and in each branch is multiplied by one of the original spreading codes. The results of the multiplication in each branch are accumulated. Because the complex scrambling codes are orthogonal to one another, when the spreading code is multiplied by the coded signal, the original symbols which were spread by that spreading code remain and all other symbols cancel. The despread operation is discussed in detail below.

The now isolated original symbols are passed to the band pass filter (BPF) 324. The BPF 324 is used to remove noise from outside of the frequency range in which the signals are located. This noise is referred to as out of band noise. After the out of band noise has been removed the signals are demodulated by demodulators 326 and 328 and the original digital signals 300 and 302 are recovered.

The processes of spreading and despreading allow multiple voice signals to be transmitted together. As described above, the example of FIG. 4 is not limited to two voice signals.

Figure 8:
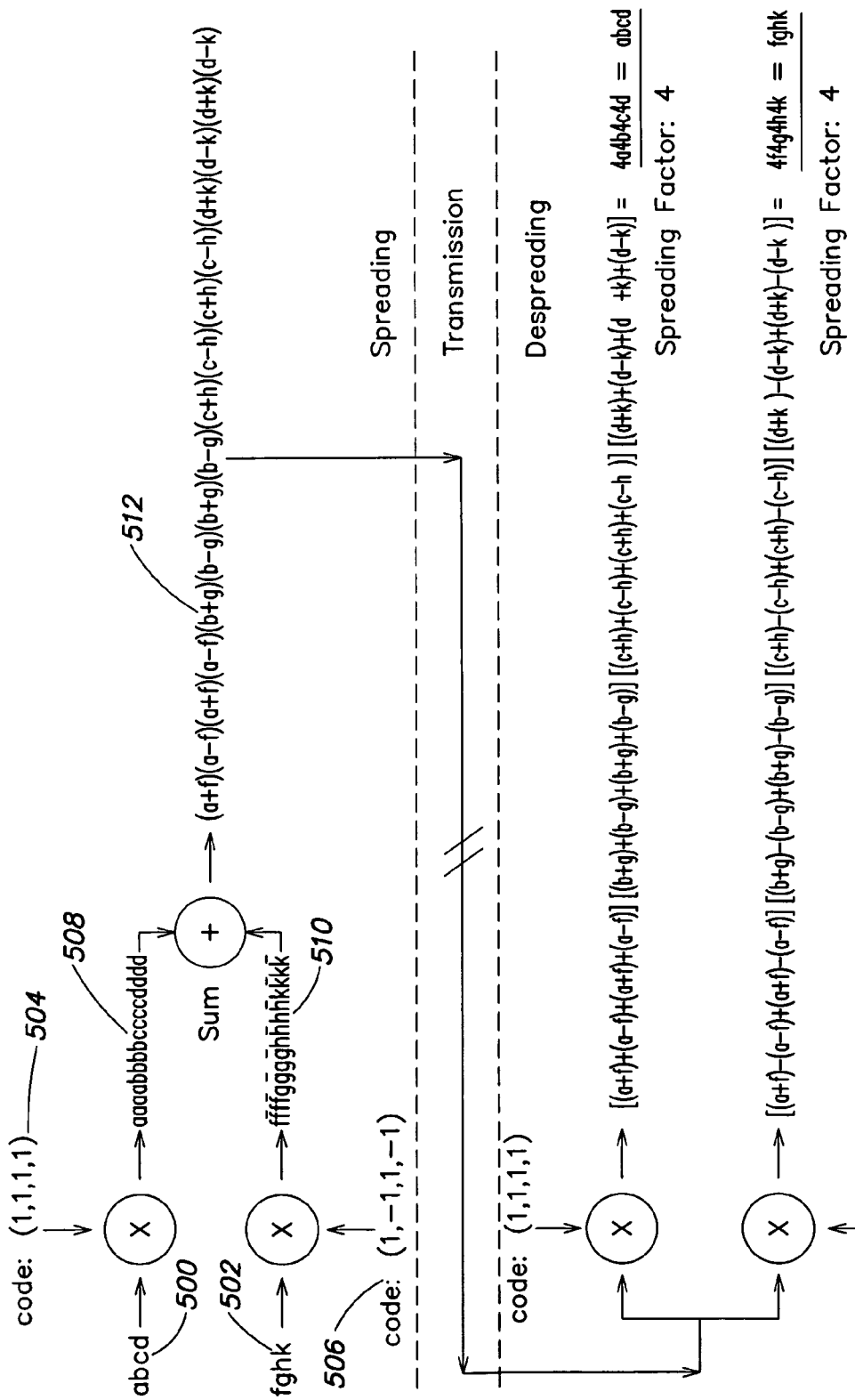
FIG. 8 is a data flow diagram that illustrates the spreading and despreading of two sets of symbols.

A detailed example of the effect of spreading and despreading on symbols is shown in FIG. 8. Two symbol sets abcd 500 and fghk 502 are each multiplied by orthogonal codes 504 and 506, respectively. Code 504 is orthogonal to code 506. The resulting coded symbol sets 508 and 510 are added together and are then transmitted as coded signal 512. When the coded signal portions, or "chips", (coded signal 512 contains 16 chips) are received, they are multiplied by their respective codes, added together and divided by the spreading factor (which in the case of the example of FIG. 8 is 4). The original signals abcd and fghk are then recovered on the receive side.

This process of despreading is computationally intensive. Several complex multiply executions are necessary to obtain the resulting data signals on the receiver end. Each chip must be multiplied by each section of the despread code and then these results must be accumulated. These multiplies and accumulates must happen at a rate canal to or greater than the rate at which the receiver receives signals. In light of the high data rates with cellular voice transmissions, digital signal processors have, until now, been unable to provide the calculation speed necessary to implement despread calculations.

The core operations for a despreader are a complex multiply and an accumulate. According to one embodiment, the despread function is carried out in an accelerator portion 216 of a digital signal processor by use of one of several DESPREAD instructions. The operands for the despread instructions may include the chips, the codes, and the previously accumulated despread values.

The DESPREAD instructions permit a DSP to quickly perform the complex multiply and accumulate functions required for the despread operation. Referring to the example of FIG. 8, the portions of signal 512 noted as (a+f), (a−f), (a+f), etc. are chips ((a+f) is a chip). Each is preferably represented digitally by 8 real bits and 8 imaginary bits. (In practice the chips may vary in size, depending on sampling rates or other system concerns, but for the purposes of illustration, and for current system preferences, chips are assumed to be 16 bits). As described above, a chip is a portion of the transmitted data signal. The received chip values are stored in the DSP registers for processing by a DESPREAD instruction.

Similarly the complex code values are stored in the DSP registers for use by a DESPREAD instruction. There are advantages to choosing the code values to be $\pm 1 \pm j$. First, the code segments are small and more easily made orthogonal. Second, they are much easier to represent using only two bits: one real bit and one imaginary bit, if the bit is set it represents a value of −1, if the bit is clear it represents a value of +1. This representation greatly reduces the hardware necessary to perform a complex multiply with the codes. Third, the codes are small enough to be easily stored in a register and don't have to be loaded from memory during execution.

As described above, the spreading factor defines the number of complex multiplies per DESPREAD operation. Because of hardware constraints, the preferred embodiment of the invention utilizes spreading factors divisible by 4, and a spreading factor of 8 is utilized for purposes of illustration.

A code with a spreading factor of 8 is represented digitally by 16 bits: eight code segments, each with a 1 bit real portion and a 1 bit imaginary portion. For digital representation, a clear bit represents a value of +1 and a set bit represents a value of −1. In this manner, two 16 bit codes may be stored in a 32 bit word. The operation of the DESPREAD instructions is described below.

As explained above, to isolate the signals from the coded data values, the chips are multiplied by the complex codes. A first DESPREAD instruction accomplishes this by executing the function:

$$\text{Resulting Signal}_{\text{Real}} = \sum_{n=0\,\text{to}\,7} (n\text{Code}_{\text{Real}} * n\text{Chip}_{\text{Real}} - n\text{Code}_{\text{Imag.}} * n\text{Chip}_{\text{Imag.}}) \quad (1)$$

$$\text{Resulting Signal}_{\text{Imag.}} = \sum_{n=0\,\text{to}\,7} (n\text{Code}_{\text{Real}} * n\text{Chip}_{\text{Imag.}} + n\text{Code}_{\text{Imag.}} * n\text{Chip}_{\text{Real}}) \quad (2)$$

The equations above calculate the signal which results from the complex multiplication of chips by despreading codes. Resulting Signal$_{Real}$ is the real portion of the resulting signal and Resulting Signal$_{Imag.}$ is the imaginary portion of the resulting signal. nCode$_{Real}$ is the real portion of the despreading code at bit value n, and nCode$_{Imag.}$ is the imaginary portion of the despread code at bit value n. Similarly nChip$_{Real}$ is the real portion of the chip value which corresponds to the despreading code at n, and nChip$_{Imag.}$ is the imaginary portion of the chip value corresponds to the code value at n.

This first type of DESPREAD instruction has the following form:

$$TRs=\text{DESPREAD}(RmQ,THrd)$$

Figure 9:
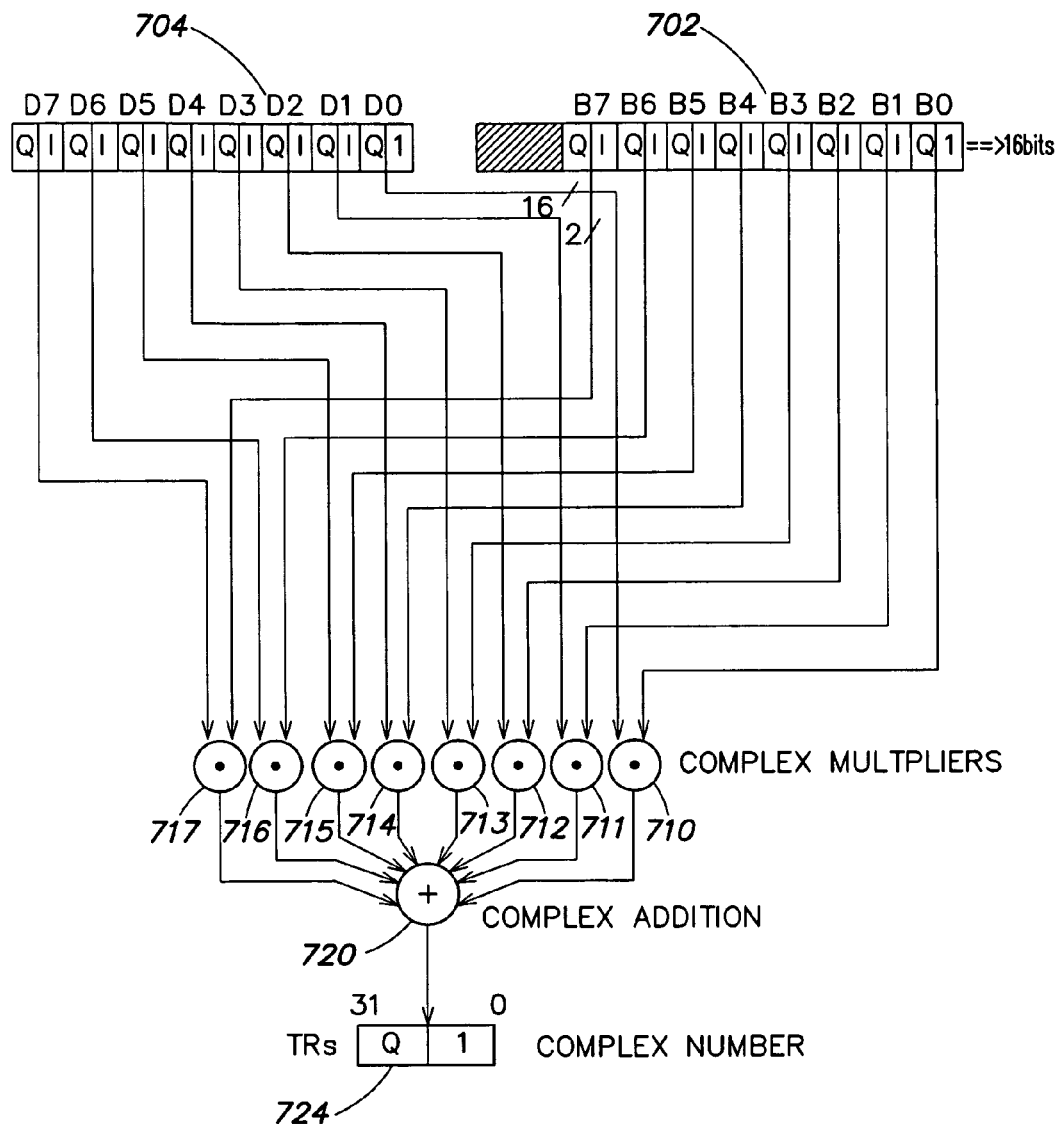
FIG. 9 is a data flow diagram that illustrates a first embodiment of operations that may be performed in response to a despread instruction.

A data flow diagram that illustrates operations performed in response to this first type of DESPREAD instruction is shown in FIG. 9. The values of eight 16 bit chips (each chip made up of 8 real bits and 8 imaginary bits) are held in quad register Rmq 704 (128 bits total) and the values of thirty two 2 bit code segments (each code made up of 1 real bit and 1 imaginary bit) are held in register pair THrd 702. Only eight codes (16 bits) of register pair 702 are used during the execution of the instruction. After this first DESPREAD instruction is executed, THrd, the code register, is logically shifted right 16 bits to load the new codes into the active portion of the register.

As shown in FIG. 9 each code segment stored in 702 is multiplied by a corresponding chip stored in of 704 using the complex multipliers 710-717. The results of these multiplies are added by a complex summing unit 720 and stored in a result register TRs 724. The operation illustrated in FIG. 9 correspond to Equations (1) and (2) above.

The complex multiplies are executed by the accelerator 216 (FIG. 3) of the DSP. By limiting the system to despread codes which may be expressed as $\pm 1 \pm j$, the complex multiplies may be executed by the DSP as multiply by a positive or negative 1, which may be implemented by the DSP as a passing of the chip portion or a negation of the chip portion. For example, if the complex code is (1, −j) then the real portion of the code is 1 and the imaginary portion of the code is −1. Any chip portion multiplied by the real portion remains the same and any chip portion multiplied by the imaginary portion is negated.

As shown in FIG. 9 eight code segments are multiplied by 8 chips and added together to provide a result. Because this first DESPREAD instruction is only able to make use of eight code segments at one time, the first despread instruction is preferably used with despread codes having a spreading factor of eight. The first despread instruction may also be used for despread codes having a spreading factor larger than eight by adding the result of a first despread instruction to the result of later despread instructions to complete a full despread operation. For example, if a despread code has a spreading factor of 32, one execution of the first despread instruction is necessary to decode the first 8 chips, and 2 executions of a despread instruction with accumulate are necessary to despread the final 16 bit code segments.

This second depsread instruction, despread with accumulate, executes the following equations:

Resulting Signal$_{Real}$ =

$$\left(\sum_{n=0\,to\,7}(n\text{Code}_{Real}*n\text{Chip}_{Real}-n\text{Code}_{Imag.}*n\text{Chip}_{Imag.})\right)+$$

Accum. Signal$_{Real}$

Resulting Signal$_{Imag.}$ =

$$\left(\sum_{n=0\,to\,7}(n\text{Code}_{Real}*n\text{Chip}_{Imag.}+n\text{Code}_{Imag.}*n\text{Chip}_{Real})\right)+$$

Accum. Signal$_{Imag.}$

Where Accum. Signal$_{Real}$ is the real portion of the previously accumulated and despread signal and Accum. Signal$_{Imag.}$ is the imaginary portion of the previously accumulated and despread signal. This second despread instruction, despread with accumulate, has the following form:

$TRs=\text{DESPREAD}(RmQ,THrd)+TRn$

Figure 10:
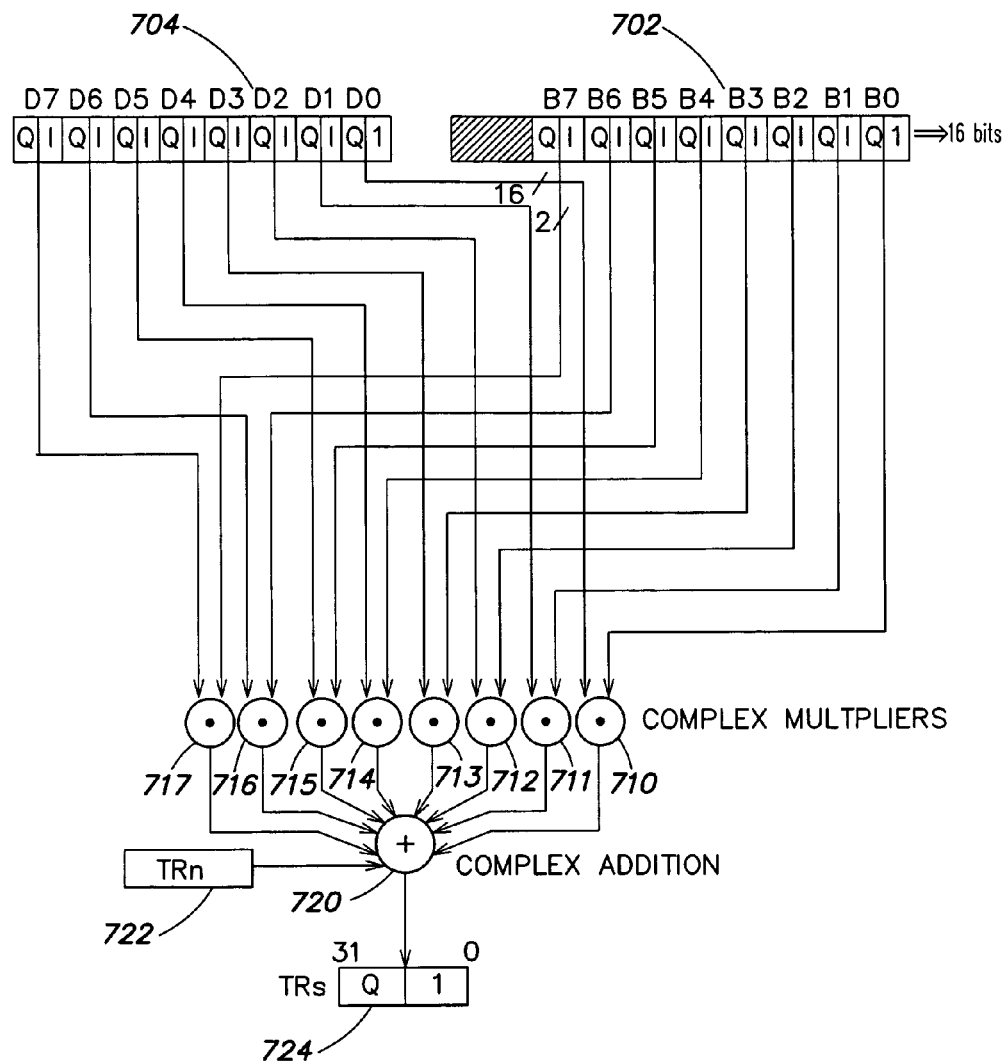
FIG. 10 is a data flow diagram that illustrates a second embodiment of operations that may be performed in response to a despread instruction.

A data flow diagram that illustrates operations performed in response to this second type of DESPREAD instruction is shown in FIG. 10. Like elements in FIGS. 9 and 10 have the same reference numerals. The operations shown in FIG. 10 are identical to those shown in FIG. 9, except that the adder 720 also adds the previous register value 722 to the current resulting signal and places the result in the output register value 724. This second DESPREAD instruction maybe referred to as a DESPREAD with accumulate instruction.

An example of software code incorporating these instructions is shown in FIG. 11. In line 602, the first eight chips of a signal portion (stored in registers R3:0) are multiplied by the first eight code segments (stored in THR registers 1:0) and the results are stored into result register TR0. In the same cycle, new chips are loaded into registers R3:0. (The DESPREAD instruction in its preferred embodiment automatically shifts the THR register to move new code portions into the active portion of the register.) In line 604, the second eight chips of a signal portion (stored in registers R7:4) are multiplied by the new code portions, the result of that multiplication is added to the previous result and the new result is stored into register TR0. In the same cycle new chips are loaded into register R7:4. The multiply and accumulate functions are repeated in lines 606 and 608. After four executions of the DESPREAD instruction, register THR (a 36 bit register) has been fully shifted (four shifts of 8 bits) and new codes must be loaded into register THR by the DSP; register THR is reloaded on line 610.

The two embodiments of the despread instruction described above are preferably used for codes with a spreading factor of 8 or greater as the instructions are designed to decode 8 chips at a time using 8 segments of code. These instructions may be used to despread signals with spreading factors divisible by 8 by calling the DESPREAD with accumulate instruction as many times as necessary to complete the despreading of the signal portion. For codes with a spreading factor of 4 (or divisible by 4), a third embodiment of the despread instruction is described. This third embodiment of the DESPREAD instruction has the following form:

$TRsd=\text{DESPREAD}(RmQ,THrd)$

Figure 12:
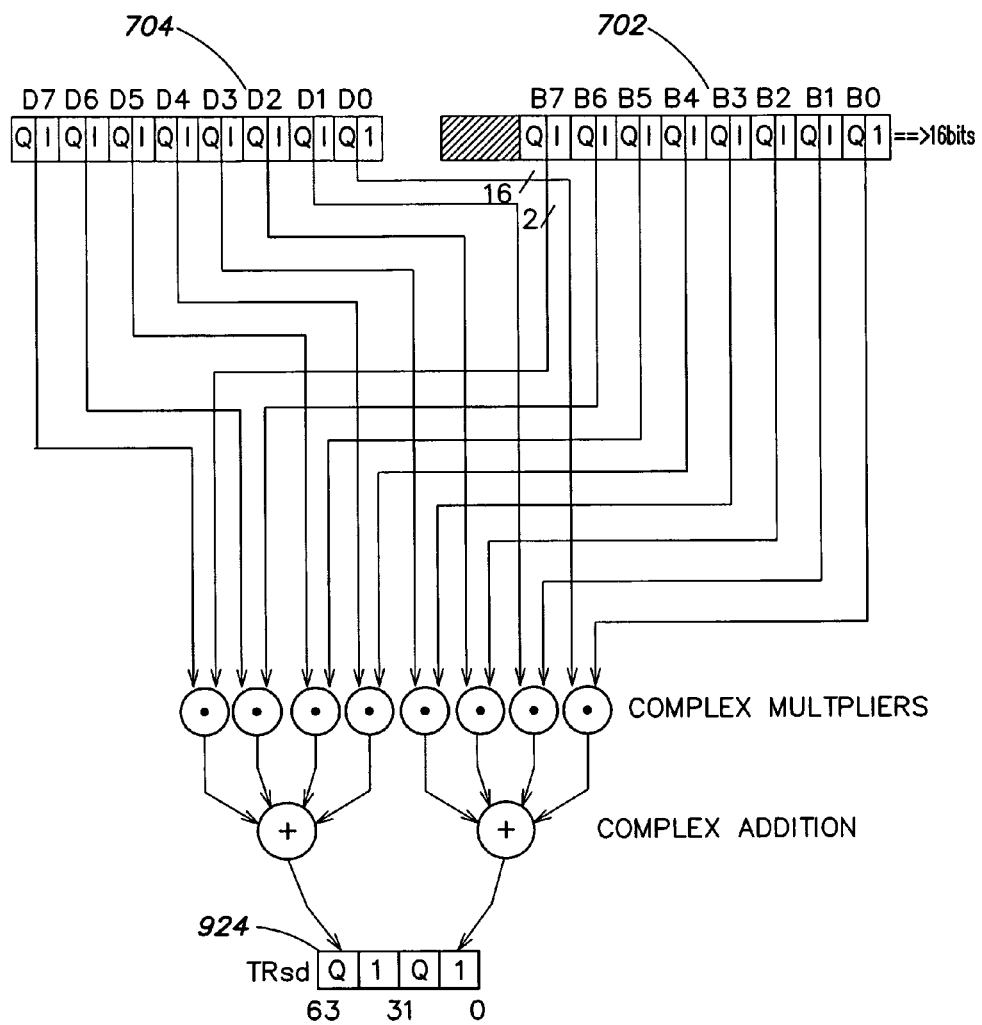
FIG. 12 is a data flow diagram that illustrates a third embodiment of operations that may be performed in response to a despread instruction.

A data flow diagram that illustrates operations performed in response to this third type of DESPREAD instruction is shown in FIG. 12. Like elements in FIGS. 9, 10 and 12 have the same reference numerals. The operations shown in FIG. 12 are similar to those shown in FIG. 10, except that since the spreading factor in codes despread by this instruction is 4, only four chips need to be added together. Therefore, this instruction makes use of the available eight complex multipliers by decoding 8 chips at once, and accumulating and storing the results into separate halves of the dual result register TRsd 924. The three described embodiments of the DESPREAD function in a DSP allow for much greater flexibility and speed in processing incoming wireless data signals.

The above examples of DESPREAD instructions are shown executed in FIGS. 9, 10 and 12 performing eight complex multiplications at one time on bit segments preferably eight bits long. The instructions are not limited to these embodiments and may be implemented using more complex multipliers or bit streams of different lengths operations can be performed in both comp blocks 112 and 114 (FIG. 2) to double processing speed.

While there have been shown and described what are at present considered the preferred embodiments of the present invention, it will be obvious to those skilled in the art that various changes and modifications may be made therein without departing from the scope of the invention as defined by the appended claims.

The invention claimed is:

1. A method for processing signal values in a digital signal processor, the method comprising:
  in response to a single instruction that specifies a plurality of signal values, each signal value comprising a real component and an imaginary component, and a plurality of code segments of a despreading code:
    complex multiplication of each signal value by a respective one of the code segments to provide a plurality of intermediate results;
    complex addition of the intermediate results to provide a despread result; and
    storing the despread result, wherein the complex multiplication, the complex addition and the storing of the despread result are executed in a single clock cycle of the digital signal processor.

2. A method as defined in claim 1 further comprising, in response to the single instruction, including a previous result from a previous instruction in the complex addition which provides the despread result.

3. A method as defined in claim 1, wherein the despreading code has a spreading factor divisible by 4.

4. A method as defined in claim 1, wherein the despreading code is divided into code segments, each code segment having comprising a 2 bit complex code comprising 1 real bit and 1 imaginary bit.

5. A method as defined in claim 4, wherein a set code bit represents a value of −1 and a clear code bit represents a value of +1.

6. A method as defined in claim 1, wherein at least one of the plurality of signal values comprises 16 bits.

7. A method as defined in claim 6, wherein at least one of the plurality of signal values comprises 8 real bits and 8 imaginary bits.

8. A method for calculating a data set in a digital signal processor, the method comprising the steps of:
in response to a single instruction that specifies a plurality of signal values, each signal value comprising a real component and an imaginary component, and a plurality of code segments:
complex multiplication of each signal value by a respective one of the code segments to provide a plurality of intermediate results;
complex addition of the intermediate results to provide an instruction result; and
storing the instruction result, wherein the complex multiplication, the complex addition and the storing of the instruction result are executed in a single clock cycle of the digital signal processor.

9. A method as defined in claim 8, wherein, in response to the single instruction, the complex addition further comprises adding a previous result from a previous instruction to the intermediate results to provide the instruction result.

10. A method as defined in claim 8, wherein the plurality of code segments has a spreading factor divisible by 4.

11. A method as defined in claim 8, wherein each one of the plurality of codes is a 2 bit complex code comprising 1 real bit and 1 imaginary bit.

12. A method as defined in claim 11, wherein a set code bit represents a value of −1 and a clear code bit represents a value of +1.

13. A method as defined in claim 8, wherein at least one of the plurality of signal values comprises 16 bits.

14. A method as defined in claim 13, wherein at least one of the plurality of signal values comprises 8 real bits and 8 imaginary bits.

15. A digital signal processor comprising:
a memory for storing instructions and operands for digital signal computations;
a program sequencer for generating instruction addresses for fetching selected ones of said instructions from said memory;
a computation block comprising a register file for temporary storage of operands and results and an execution block for executing a single decoding instruction that specifies a plurality of signal values, each signal value comprising a real component and an imaginary component, and a plurality of code segments, said execution block comprising a complex multiply and accumulate engine for multiplying portions of the data signal by the code and accumulating the results; and
wherein, in response to an execution of the single decoding instruction the digital signal processor decodes the signal values by:
performing a complex multiplication of each signal value by a respective one of the code segments to provide a plurality of intermediate results,
performing an a complex addition of the intermediate results to provide a despread result, and
storing the despread result, wherein the complex multiplication, the complex addition and the storing of the despread result are executed in a single clock cycle of the digital signal processor.

16. A digital signal processor as defined in claim 15, wherein the plurality of code segments has a spreading factor divisible by 4.

17. A digital signal processor as defined in claim 15, wherein each code segment comprises a 2 bit complex code comprising 1 real bit and 1 imaginary bit.

18. A digital signal processor as defined in claim 17, wherein a set code bit represents a value of −1 and a clear code bit represents a value of +1.

19. A digital signal processor as defined in claim 15, wherein at least one of the plurality of signal values comprises 16 bits.

20. A digital signal processor as defined in claim 15, wherein at least one of the plurality of signal values comprises 8 real bits and 8 imaginary bits.

21. A method for calculating output data in a digital signal processor, the method comprising the steps of:
in response to a single instruction that specifies at least a set of complex first operands each one of the first operands comprising 8 real bits and 8 imaginary bits and a set of complex second operands each one of the second operands comprising 1 real bit and 1 imaginary bit:
performing a complex multiplication of each one of the first operands by a respective one of the second operands to provide a plurality of intermediate results;
performing a complex addition of the intermediate results to provide an instruction result; and
outputting the instruction result, wherein the complex multiplication, the complex addition and the outputting the instruction result are executed in a single clock cycle of the digital signal processor.

22. A method as defined in claim 21, wherein a set bit in one of the second operands represents a value of −1 and a clear bit in one of the second operands represents a value of +1.

23. A method as defined in claim 21, wherein the set of complex second operands comprises a despreading code.

24. A method as defined in claim 21, wherein the set of complex first operands comprises an incoming data signal.

25. A method as defined in claim 24, wherein the incoming data signal is a voice transmission signal.

26. A method for processing signal values in a digital signal processor comprising the steps of:
(a) in response to a single instruction executed within a single clock cycle of the digital signal processor, specifying a set of complex signal values, each signal value comprising a real component and an imaginary component, and a corresponding set of complex code segments, performing a complex multiply of each signal value by a corresponding code segment to provide a set of intermediate values; and (b) in further response to said single instruction performing complex addition of the intermediate values to provide a processed signal value.

27. A method as defined in claim 26 further comprising the steps of repeating steps (a) and (b) for a plurality of sets of complex signal values to provide a stream of processed signal values.

28. A method as defined in claim 26 further wherein each of the complex code segments is a two bit complex code.

* * * * *